3,077,541
ENGINE FLYWHEEL STRUCTURE
James K. Valus, Milwaukee, Wis., assignor to Nordberg Manufacturing Co., Milwaukee, Wis., a corporation of Wisconsin
Filed June 13, 1960, Ser. No. 35,565
7 Claims. (Cl. 290—1)

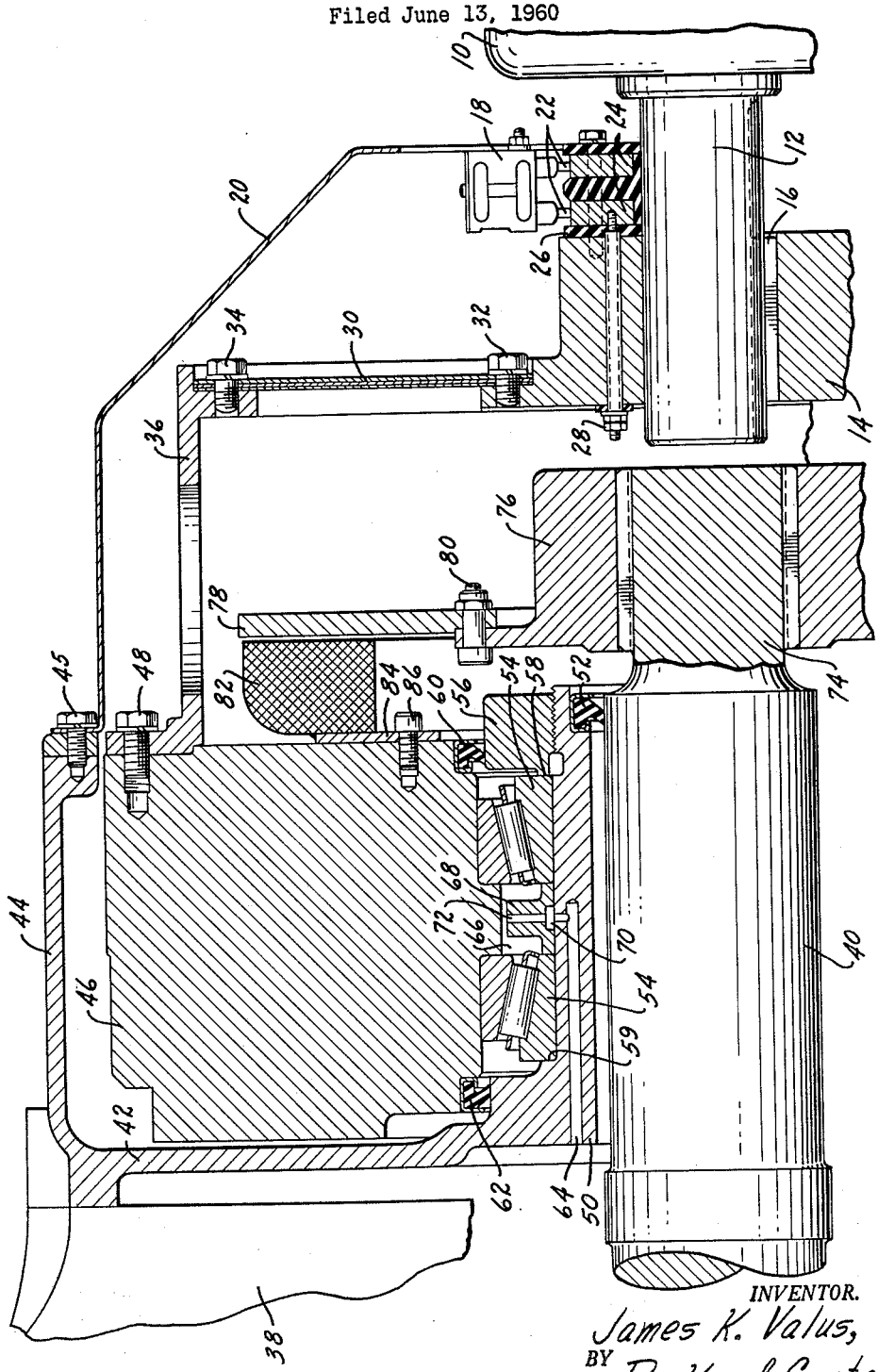

This invention relates to automatic power plants of the type where a rotating flywheel is used to start a stationary stand-by engine upon the failure of the normal electric power supply.

One purpose of this invention is to provide an automatic power plant which is effective to supply standby power immediately upon the failure of the normal electric power supply.

Another purpose is an improved means for starting a standby prime mover for use in a power plant of the type described.

Another purpose is an improved means for mounting a rotating flywheel, used to start a stationary engine, on the engine structure.

Other purposes will appear in the ensuing specification, drawing and claims.

The invention is illustrated diagrammatically in the following drawing wherein a starting-generating dynamo is indicated at 10. The term starting-generating dynamo is meant to include any type of unit which may function both as a generator and as a motor. For example, a single machine may be wired to operate both as a generator and as a motor, or there may be a separate alternator and a separate motor. In addition, the term includes an alternator and a motor exciter. The novelty of this invention does not reside in the unit indicated diagrammatically at 10 and this unit may be any machine combination which is effective to operate as a motor when supplied with electric current and to operate as a generator when driven by a suitable prime mover.

Extending outwardly from the starting-generating dynamo 10 is a shaft 12 having a cylindrical drive adapter 14 keyed thereto, as at 16. A brush holder 18 is mounted on a cylindrical guard 20 and may have a pair of brushes 22 positioned to contact two spaced slip rings 24 which are mounted about the shaft 12. An insulating structure 26 encloses the sides and inner surface of the slip rings to electrically isolate the rings from the drive adapter 14 and from the shaft 12. An insulated pin 28 extends through the drive adapter 14 and is in electrical contact with the slip rings. The pin 28 may be connected, by wires not shown, to a magnetic pole piece hereinafter described. In operation, the brushes 22 will be supplied with electric current through a switch, not shown, when there is a failure in the normal electrical supply to the power station. The current supplied to the brushes will be transferred by the slip rings and insulated pin to the magnetic pole piece to operate a magnetic clutch hereinafter described.

A cylindrical coupling member 30, which may be laminated, is fastened by screws or the like 32 to the drive adapter 14 and by screws 34 to a cylindrical coupling adapter 36.

A prime mover, which may be a gasoline engine or otherwise, is indicated at 38 and has an outwardly extending crankshaft 40 and a frame indicated at 42. The frame 42 has an outer cylindrical portion 44 which is connected by screws or the like 45 to the guard 20, and defines a cylindrical space within which is mounted a cylindrical flywheel 46. The flywheel is connected to the coupling adapter 36 by means of screws or the like 48 and is driven by the shaft 12 through the drive adapter and the coupling adapter. In other words, the flywheel will rotate when the starting-generating dynamo 10 is supplied with electric power and is operating as a motor.

A frame extension 50, which may be cylindrical, extends along the engine crankshaft 40 and is spaced therefrom. The frame extension may be integral with the frame 42 or may be a separate section bolted or otherwise secured to the frame. A seal 52 may be positioned between the frame extension 50 and the crankshaft 40 adjacent the outer ends of these two members. Suitable axially spaced bearings 54 are mounted on the frame extension 50 to support the flywheel 46 for rotation relative to the engine frame. A bearing block or mounting block 56 is mounted on the frame portion 50 at the outward end thereof and has a surface 58 in contact with the right hand bearing 54 to form a lateral support therefor. Similarly, a surface 59 on the frame 42 may form a lateral support for the left hand bearing. A seal ring 60 may be mounted on the bearing block 56 and positioned in contact with the flywheel 46. There may be a similar seal ring 62 mounted on the frame 42 at the left hand side of the structure. The two seal rings 60 and 62 seal off the chamber containing the bearings 54 to prevent any loss of lubricant.

In order to lubricate the bearings supporting the flywheel 46, there is a bore or passage 64 formed in the frame extension 50 which opens into a chamber or area 66 between the bearings. A small cylindrical block or the like 68 positioned in the chamber 66 has a circumferential inner groove 70 in communication with the passage 64 and a plurality of spaced ports 72 which are adapted to direct lubricant, for example oil, to various points around the chamber circumference.

The engine crankshaft 40 has a far outward extension 74, which may be reduced in diameter, and which slidably supports a coupling member 76. The coupling 76 is keyed or splined to the crankshaft extension 74 to prevent relative rotation but there is limited axial movement between the two members. An armature 78, generally cylindrical in form, is mounted on the coupling member 76 by a suitable bolt connection 80. A cylindrical magnetic pole piece 82 is mounted on the flywheel 46 by means of a cylindrical plate 84 and suitable screws 86. The magnetic pole piece includes a conventional coil which is connected, through wires not shown, to the insulated pin 28 so that electrical current may flow to the magnetic pole piece and induce a magnetic field therein. This magnetic field provides the force necessary to hold the armature 78 against the pole piece and hence form a coupling between the flywheel 46 and the engine crankshaft 40.

The use, operation and function of the invention are as follows:

Shown and described herein is an automatic power plant, and in particular improvements to said power plant relating to the means for starting a stand-by engine. The power plant includes a starting-generating dynamo, normally operating as a motor, and, which may be a single machine wired for both generating and motoring action, or a separate alternator and a separate motor, or an alternator with a motor exciter, or any other combination which will provide both a motoring and generating action. Electric power is supplied to the starting-generating dynamo which drives a flywheel mounted on the stand-by engine frame. A magnetic clutch is used to connect the flywheel to the engine crankshaft when the normal power supplied to the starting-generating dynamo fails. As shown in the drawings, electric power will be supplied to the brushes, slip rings, and other eletrical connecting apparatus upon failure of the normal power supply, so that the pole piece 82 of the magnetic clutch will be energized to attract the armature. Movement of the armature to the pole piece connects the flywheel and the engine crankshaft and the inertia of the moving flywheel starts the engine.

It has been heretofore proposed to mount the flywheel on either the generator shaft or on the engine shaft itself. The generator shaft is normally not constructed such that its bearings will withstand the heavy load of the flywheel. When the flywheel is supported directly by the engine crankshaft, there will be little or no relative rotation between the flywheel and the crankshaft when the engine is operating, and hence the bearings supporting the flywheel will wear or brinell. An additional disadvantage in placing the flywheel directly on the engine crankshaft is that lubrication becomes difficult. For example, when grease is used as a lubricant, and the engine is operated at a relatively high speed, for example 1,800 r.p.m., depending upon size of the bearing the grease will probably be thrown to the outside of the bearings by centrifugal force, leaving the inner race of the bearings inadequately lubricated. In any event, large bearing sizes and high speeds will result in improper lubrication with grease. When oil is used as a lubricant, it is practically impossible to pump oil to the bearings as both the flywheel and the engine crankshaft supporting the flywheel rotate.

To overcome the above disadvantages, the flywheel has been mounted on a projection of the engine frame which is concentric with the crankshaft. As the frame supporting the flywheel does not rotate, the bearings will not be subjected to excessive wear. Similarly, there is no problem of supplying lubricant to the bearings during operation.

A flywheel, such as that shown herein, develops high kinetic energy when rotating and will very quickly start an internal combustion engine and bring the engine up to operating speed.

There is, of course, some slippage at the magnetic clutch upon initial contact between the pole piece and the armature. However, it has been found, that after approximately two revolutions of the flywheel the engine is up to speed and there is no more slippage between the clutch members. The engine presents a very small resistance for the flywheel to overcome when starting and hence may be quickly brought up to operating speed with minimum slippage between the clutch elements.

To quickly summarize the operation, when the normal power supplied to the power station and hence to the starting-generating dynamo fails, electric current is automatically supplied to the magnetic pole piece for coupling the rotating flywheel to the stationary engine. The flywheel provides inertia to start the engine and the engine is quickly brought up to operating speed. The engine then drives the starting-generating dynamo through the magnetic clutch, the flywheel and the drive between the flywheel and the shaft of the starting-generating dynamo.

The power station shown herein has particular application at remote radio relay locations, such as used in a transcontinental microwave system, where it is impossible to have manual starting of the stand-by engine. In such an operation, it is absolutely necessary to continuously supply power to the electrical equipment and there can be no appreciable time lag between failure of the normal supply and the operation of the unit 10 as a generator. The automatic power plant shown herein will quickly start and will be driving the generator 10 after no more than two revolutions of the engine. In addition to having utility in an automatic power plant of the type described, the engine and flywheel construction has other uses, for example in a wind machine wherein the force of the wind is used to rotate the flywheel. The flywheel in turn may be used to start the engine when the wind dies down.

Whereas the preferred form of the invention has been shown and described herein, it should be realized that there are many modifications, substitutions, and alternations thereto within the scope of the following claims.

I claim:

1. A power plant including an engine having a frame and a crankshaft, a non-rotatable frame extension concentric with said engine crankshaft and radially spaced therefrom, a flywheel concentric with said crankshaft and supported on said frame extension for rotation relative thereto, means for coupling said flywheel to said crankshaft, a starting-generating dynamo associated with said engine and having a shaft extending therefrom, a drive between the flywheel and the shaft of the starting-generating dynamo, and means responsive to a failure in the current supply to the starting-generating dynamo for actuating the coupling to connect the flywheel and the engine crankshaft.

2. The structure of claim 1 further characterized in that the coupling between the crankshaft and the flywheel is a magnetic coupling.

3. The structure of claim 2 further charcterized in that said magnetic coupling includes an armature movably mounted on the engine crankshaft and a magnetic pole piece mounted on the flywheel in spaced relation to said armature such that a magnetic field developed in said pole piece will attract the armature thereto.

4. The structure of claim 2 further characterized in that said magnetic coupling includes an armature mounted on said crankshaft for limited axial movement and a pole piece mounted on said flywheel in spaced relation to said armature.

5. The structure of claim 1 further characterized by bearings supporting said flywheel on said frame extension.

6. The structure of claim 5 further characterized by means for lubricating said bearings during rotation of said flywheel.

7. A power plant including an engine having a frame and an engine crankshaft, a non-rotatable frame extension concentric with said engine crankshaft and radially spaced therefrom, a flywheel concentric with said crankshaft and supported on said frame extension for rotation relative thereto, bearings between said flywheel and frame extension, magnetic means for coupling the flywheel to the crankshaft including an annular armature concentric with the crankshaft and mounted at the end thereof, an annular concentric pole piece mounted on the flywheel in general alignment with and axially spaced from the armature, a starting-generating dynamo associated with said engine and having a shaft extending therefrom, a drive between the flywheel and the shaft of the starting-generating dynamo, and means responsive to a failure in the current supply to the starting-generating dynamo for actuating the magnetic coupling to thereby connect the flywheel and the engine crankshaft.

References Cited in the file of this patent

UNITED STATES PATENTS

| | | |
|---|---|---|
| 2,688,704 | Christenson | Sept. 7, 1954 |
| 2,972,056 | Park et al. | Feb. 14, 1961 |